(12) United States Patent
Kobayashi (10) Patent No.: US 9,566,938 B2
(45) Date of Patent: Feb. 14, 2017

(54) GAS GENERATOR (71) Applicant: DAICEL CORPORATION, Osaka-shi, Osaka (JP)

(72) Inventor: Tomoharu Kobayashi, Tatsuno (JP)

(73) Assignee: DAICELL CORPORATION, Osaka-Shi (JP)

( * ) Notice: Subject to any disclaimer, the term of this patent is extended or adjusted under 35 U.S.C. 154(b) by 0 days.

(21) Appl. No.: 14/782,204

(22) PCT Filed: Mar. 5, 2014

(86) PCT No.: PCT/JP2014/055534
§ 371 (c)(1),
(2) Date: Oct. 2, 2015

(87) PCT Pub. No.: WO2014/171207
PCT Pub. Date: Oct. 23, 2014

(65) Prior Publication Data
US 2016/0023628 A1    Jan. 28, 2016

(30) Foreign Application Priority Data

Apr. 15, 2013 (JP) .................................. 2013-084475

(51) Int. Cl.
*B60R 21/274* (2011.01)
*B60R 21/272* (2006.01)
(Continued)

(52) U.S. Cl.
CPC ................ *B60R 21/272* (2013.01); *B01J 7/00* (2013.01); *B60R 21/264* (2013.01);
(Continued)

(58) Field of Classification Search
CPC .... B60R 21/272; B60R 21/268; B60R 21/274; B60R 21/264; B60R 21/2644; B60R 21/26; B60R 2021/2685; B60R 2021/2642; B60R 2021/2648; B60R 2021/26076; B60R 2021/26094; B01J 7/00; F17C 2270/0181
(Continued)

(56) References Cited

U.S. PATENT DOCUMENTS 5,195,777 A    3/1993 Cuevas
5,536,039 A *  7/1996 Cuevas ................. B60R 21/272
                                              222/5
(Continued)

FOREIGN PATENT DOCUMENTS

DE    19954738 A1    5/2001
JP    6-8789 A       1/1994
(Continued)

OTHER PUBLICATIONS

Extended European Search Report for European Application No. 14785731.2, dated Oct. 24, 2016.

*Primary Examiner* — Keith Frisby
(74) *Attorney, Agent, or Firm* — Birch, Stewart, Kolasch & Birch, LLP (57) ABSTRACT

The present invention provides a gas generator, including
a housing having therein an ignition device chamber, which is provided with a gas discharge port and accommodates an ignition device, and a pressurized gas chamber filled with a pressurized gas,
the ignition device chamber and the pressurized gas chamber being separated by a partition wall having a communication hole,
the partition wall being in a cup-like shape which includes a bottom surface and a circumferential wall surface, projects toward the pressurized gas chamber and has a flange portion at a portion corresponding to an opening in the cup-like shape of the partition wall,
(Continued)

only the circumferential wall surface having the communication hole, the flange portion being fixed to the housing, a disk closing member being disposed inside the partition wall to be movable in the axial direction of the housing with a distance from the bottom surface, prior to activation, the communication hole being closed by a circumferential surface of the disk closing member, and at the time of activation, the closing member being moved toward the bottom surface by combustion products generated by the ignition device, thereby opening the communication hole and making communication between the ignition device chamber and the pressurized gas chamber.

6 Claims, 3 Drawing Sheets

(51) Int. Cl.
  *B60R 21/264* (2006.01)
  *B01J 7/00* (2006.01)
  *B60R 21/26* (2011.01)

(52) U.S. Cl.
  CPC ........ *B60R 21/274* (2013.01); *B60R 21/2644* (2013.01); *B60R 2021/26035* (2013.01); *B60R 2021/26076* (2013.01); *F17C 2270/0181* (2013.01)

(58) Field of Classification Search
  USPC .................. 280/737, 736, 741; 102/530, 531
  See application file for complete search history.

(56) References Cited

U.S. PATENT DOCUMENTS

| | | |
|---|---|---|
| 5,570,904 A | 11/1996 | Cuevas |
| 5,584,505 A * | 12/1996 | O'Loughlin .......... B60R 21/272 222/5 |
| 5,609,362 A | 3/1997 | Sparks et al. |
| 5,618,057 A | 4/1997 | Johnson et al. |
| 5,803,494 A * | 9/1998 | Headley ................ B60R 21/264 280/736 |
| 2008/0284148 A1 | 11/2008 | Bjorklund et al. |

FOREIGN PATENT DOCUMENTS

| | | |
|---|---|---|
| JP | 8-85410 A | 4/1996 |
| JP | 9-58394 A | 3/1997 |
| JP | 3035831 U | 4/1997 |
| JP | 2008-509834 A | 4/2008 |
| JP | 2010-18132 A | 1/2010 |

* cited by examiner

GAS GENERATOR

FIELD OF INVENTION

The present invention relates to a gas generator used in a restraining device of an airbag system for a vehicle.

DESCRIPTION OF RELATED ART

As a gas generator using a pressurized gas, the structure is known in which an opening of a bottle in which the pressurized gas is sealed is closed by a closing member and the pressurized gas is discharged by fracturing the closing member at the time of activation.

The closing member often uses, for example, a thin metallic rupturable plate and is directly or indirectly fractured or pulverized and cleaved by a pressure or a shock wave generated by combustion of an explosive (by an ignition device) or the like.

Since the rupturable plate is under a pressure (a filling pressure) of the gas sealed inside the bottle, an explosive or the like (an ignition device) generating a force exceeding the filling pressure need to be used to break the rupturable plate in this state.

U.S. Pat. No. 5,609,362 discloses a gas generator using a pressurized gas, in which a plug 18 corresponding to the rupturable plate has a thin wall portion 26 and is fractured and opened by a movable body 56 at the time of activation.

In U.S. Pat. No. 5,609,362, since the plug 18 receives the gas pressure over the entire surface, a large force is required to fracture the plug.

DISCLOSURE OF THE INVENTION

Invention 1 provides a gas generator, including
a housing having therein an ignition device chamber, which is provided with a gas discharge port and accommodates an ignition device, and a pressurized gas chamber filled with a pressurized gas,
the ignition device chamber and the pressurized gas chamber being separated by a partition wall having a communication hole,
the partition wall being in a cup-like shape which includes a bottom surface and a circumferential wall surface, projects from the ignition device chamber toward the pressurized gas chamber and has a flange portion at a portion corresponding to an opening in the cup-like shape of the partition wall,
only the circumferential wall surface having the communication hole,
the flange portion being fixed to the housing,
a disk closing member being disposed inside the partition wall to be movable in the axial direction of the housing with a distance from the bottom surface,
prior to activation, the communication hole being closed by a circumferential surface of the disk closing member, and
at the time of activation, the closing member being moved toward the bottom surface by combustion products generated by activation of the ignition device, thereby opening the communication hole and making communication between the ignition device chamber and the pressurized gas chamber.

Invention 2 provides a gas generator including
a housing having therein an ignition device chamber, which is provided with a gas discharge port and accommodates an ignition device, and a pressurized gas chamber filled with a pressurized gas, the ignition device chamber and the pressurized gas chamber being separated by a partition wall having a communication hole,
the partition wall being in a cup-like shape which includes a bottom surface and a circumferential wall surface, projects from the pressurized gas chamber toward the ignition device chamber and has a flange portion at a portion corresponding to an opening in the cup-like shape of the partition wall,
only the circumferential wall surface having the communication hole,
the flange portion being fixed to the housing,
an annular closing member being disposed outside the partition wall to be movable in the axial direction of the housing with a distance from the flange portion,
prior to activation, the communication hole being closed by an inner circumferential surface of the annular closing member abutting against an outer circumferential wall surface of the partition wall, and
at the time of activation, the closing member being moved toward the flange portion by combustion products generated by activation of the ignition device, thereby opening the communication hole and making communication between the ignition device chamber and the pressurized gas chamber.

BRIEF DESCRIPTION OF THE DRAWINGS

The present invention will become more fully understood from the detailed description given hereinbelow and the accompanying drawings which are given by way of illustration only, and thus are no limitative of the present invention and wherein:

FIG. 3 is, in (a), a partial enlarged view, corresponding to FIG. 2, of an embodiment other than that shown in FIG. 1, and, in (b) a partial enlarged view of the configuration shown in (a) in FIG. 3.

FIG. 5 is, in (a), a partial enlarged view, corresponding to FIG. 2, of an embodiment other than those shown in FIGS. 1, 3, and 4, and, in (b), a partial enlarged view of an embodiment other than that shown in (a) in FIG. 5.

DETAILED DESCRIPTION OF THE INVENTION

The present invention provides a gas generator which uses a pressurized gas and is for use of a restraining device, or the like, the gas generator being capable of opening a gas discharge path, without breaking a rupturable plate (a closing member), and reducing a load necessary therefor.

In the gas generator in accordance with the present invention, prior to activation, the communication hole for making communication between the pressurized gas chamber and the ignition device chamber is closed by the closing member, and at the time of activation, the communication hole is opened by causing the closing member to move axially, without fracturing, the pressurized gas chamber and the ignition device chamber communicate with each other and the gas discharge path is opened.

Therefore, no fractured pieces of the closing member are generated, and there is no possibility that the gas discharge path is closed by the fractured pieces.

Further, the closing member is only to be moved axially, and a force necessary therefor is less than that needed for fracturing. With that, the necessary load is reduced by comparison with the conventional configurations. As a result, the gas generator itself can be reduced in size and weight.

The housing may be formed as a single body, or may be formed by a pressurized gas chamber housing forming the pressurized gas chamber, and an ignition device chamber housing forming the ignition device chamber.

The partition wall is present between the pressurized gas chamber and the ignition device chamber and may be fixed to the housing or molded integrally therewith.

When the housing is formed by the pressurized gas chamber housing and the ignition device chamber housing, the partition wall may be fixed to, or molded integrally with, either one of the housings.

The disk closing member is disposed inside the cup-like partition wall to be axially movable with a distance from the bottom surface.

Prior to activation, the communication hole is closed by the circumferential surface of the disk closing member.

The disk closing member can be directly press-fitted into the cup-like partition wall and fixed thereto by welding. In this case, the welding strength (for example, the welding surface area) is adjusted to enable axial movement at the time of activation.

Welding is preferable in view of enhancing the sealing, and when welding is used, the welding region is not restricted, provided that the pressurized gas does not leak from the pressurized gas chamber into the ignition device chamber.

In some cases, the disk closing member can be attached by direct press-fitting into the cup-like partition wall. It is also possible to interpose a sealing member such as a silicone rubber when press-fitting.

No communication hole is provided in the bottom surface of the partition wall, and prior to activation, a high pressure is applied to the bottom surface and the circumferential wall surface of the partition wall from the pressurized gas chamber.

However, the load applied to the circumferential surface of the closing member is received at least by the surface corresponding to the opening area of the communication hole, and where the partition wall is sufficiently thick to withstand the filled gas pressure of the pressurized gas, the load applied to the circumferential surface of the closing member at the time of activation does not so much inhibit the axial movement of the closing member.

Further, the pressure of the pressurized gas acts upon the circumferential wall surface of the partition wall so as to increase the closing strength of the communication hole and the fixing strength of the disk closing member prior to activation.

The distance between the disk closing member and the bottom surface is a gap enough to make the communication hole opened when the disk closing member moves toward the bottom surface at the time of activation.

In the disk closing member, a through-hole may be formed in the thickness direction.

Where the through-hole is provided in the disk closing member, when the disk closing member moves toward the bottom surface, the gas (the air which penetrated during assembling) present between the disk closing member and the bottom surface can escape from the through-hole into the ignition device chamber. Therefore, the movement of the disk closing member is not inhibited.

The formation position and number of the through-holes are not particularly limited, provided that the hole passes axially through from the one end surface to the other end surface of the closing member, but the gas-generating agent should not pass through the through-hole. For example, the size of the through-hole can be adjusted, or a metal mesh, or the like, can be disposed on the side facing the ignition device chamber.

When the pressure generated in the ignition device chamber is sufficiently high, the disk closing member, having received the sufficiently high pressure, moves while contracting a space between the disk closing member and the bottom surface. Therefore, where the communication hole is open, when a space is formed between the closing member and the bottom surface of the partition wall, the closing member is not required to move to come into contact with the bottom surface. As a result, even when the through-hole is not provided in the closing member, the movement of the disk closing member is not impeded and the communication hole is opened.

When the ignition device is activated, the pressure inside the ignition device chamber rises, the gas discharge port is opened, and the gas is discharged.

At the same time, the disk closing member moves in the X-axis direction (toward the bottom surface of the partition wall), and the communication hole of the circumferential wall surface of the partition wall is opened. As a result, the pressurized gas chamber and the ignition device chamber communicate with each other, and the pressurized gas flows into the ignition device chamber and is discharged from the gas discharge port.

Thus, the closing member used in the gas generator of the present invention opens the gas discharge path only by moving. Therefore, no fractured pieces are generated by fracturing of the rupturable plate used in conventional gas generators, and there is no possibility that the gas discharge path is closed by the fractured pieces.

In the gas generator in accordance with the present invention, the pressure inside the pressurized gas chamber is applied inward only from the circumferential surface of the disk closing member through the circumferential wall surface of the partition wall (that is, the closing member is pressed to be contracted from outside).

Meanwhile, in a conventional closing member (a rupturable plate), a pressure of the pressurized gas is received from the front surface. Therefore, a very high pressure is applied to the closing member, and where the closing member is to be ruptured, a very strong force (an igniter output) is needed therefor.

In the gas generator in accordance with the present invention, a force required to move the closing member is small by comparison with that required to rupture the conventional closing member, and the output of the ignition device can be reduced. The entire gas generator can be accordingly reduced in size and weight.

A preferable aspect 1-2 of the invention 1 is the gas generator wherein, the disk closing member has an annular groove portion at the central portion in the thickness direction of the circumferential surface, and a first annular circumferential wall portion and a second annular circumferential wall portion at both ends respectively in the thickness direction of the circumferential surface, and prior to activation, the communication hole is closed by a space bounded by the annular groove portion, the first annular circumferential wall portion, and the second annular circumferential wall portion in a state in which the annular groove portion of the disk closing member faces the communication hole, and the first annular circumferential wall portion and the second annular circumferential wall portion abut against the circumferential wall surface of the partition wall.

The disk closing member abuts against and is fixed to the circumferential wall surface of the partition wall in the first annular circumferential wall portion and the second annular circumferential wall portion, and the contact surface area is reduced by comparison with the case in which the disk closing member abuts and is fixed over the entire circumferential surface thereof.

Therefore, the force necessary to move the disk closing member at the time of activation can be reduced.

When the first annular circumferential wall portion and the second annular circumferential wall portion are fixed by welding to the circumferential wall surface of the partition wall, the surface area of the welded portion can be also made small and of a constant width. As a result, the force necessary to move the disk closing member at the time of activation can be made small and constant while maintaining the fixing strength.

Therefore, such a gas generator is obtained that the load necessary to move the closing member is stable and a highly reproducible output is obtained.

A preferable aspect 1-3 of the invention 1 is the gas generator wherein, the closing member has a first circular base plate portion and a second circular base plate portion, has an annular groove in a circumferential surface therebetween, and has a through-hole in the thickness direction, a cross-sectional area of the second circular base plate portion in a radial direction thereof is greater than a cross-sectional area of the first circular base plate portion in a radial direction thereof, and the first circular base plate portion is arranged to face the bottom surface of the partition wall, prior to activation, the communication hole is closed by a circumferential surface of the first circular base plate portion, and at the time of activation, the first circular base plate portion of the closing member is moved toward the bottom surface by combustion products generated by activation of the ignition device, thereby opening the communication hole and making communication between the ignition device chamber and the pressurized gas chamber.

In the closing member, the cross-sectional area of the second circular base plate portion in the radial direction thereof is greater than the cross-sectional area of the first circular base plate portion in the radial direction thereof.

Therefore, at the time of activation, the second circular base plate portion having a larger pressure-receiving area receives the pressure, a large load is applied to the closing member, and the movement thereof is facilitated.

This gas generator operates in the same manner as the gas generator of the invention 1.

A preferable aspect 1-4 of the preferable aspect 1-3 is the gas generator wherein, the first circular base plate portion of the closing member has an annular groove portion at the central portion in the thickness direction of the circumferential surface, and a first annular circumferential wall portion and a second annular circumferential wall portion at both ends respectively in the thickness direction of the circumferential surface, and prior to activation, the communication hole is closed by a space bounded by the annular groove portion, the first annular circumferential wall portion, and the second annular circumferential wall portion in a state in which the annular groove portion of the first circular base plate portion faces the communication hole, and the first annular circumferential wall portion and the second annular circumferential wall portion abut against the circumferential wall surface of the partition wall.

The first circular base plate portion of the closing member abuts against and is fixed to the circumferential wall surface of the partition wall in the first annular circumferential wall portion and the second annular circumferential wall portion, and the contact surface area is reduced by comparison with the case in which the disk closing member abuts and is fixed over the entire circumferential surface thereof.

Therefore, the force necessary to move the closing member at the time of activation can be reduced.

Further, when the first annular circumferential wall portion and the second annular circumferential wall portion are fixed by welding to the circumferential wall surface of the partition wall, the surface area of the welded portion can be also made small and of a constant width. Therefore, the force necessary to move the closing member at the time of activation can be made small and constant while maintaining the fixing strength.

Therefore, such a gas generator is obtained that the load necessary to move the closing member is stable and a highly reproducible output is obtained.

The invention 2 is explained in detail hereinbelow.

The housing may be formed as a single body, or may be formed by a pressurized gas chamber housing forming the pressurized gas chamber, and an ignition device chamber housing forming the ignition device chamber.

The partition wall is present between the pressurized gas chamber and the ignition device chamber and may be fixed to the housing or molded integrally therewith.

When the housing is formed by the pressurized gas chamber housing and the ignition device chamber housing, the partition wall may be fixed to, or molded integrally with, either one of the housings.

The protrusion direction of the cup-like partition wall is toward the ignition device chamber, that is, opposite to that in the gas generator of the invention 1.

Since the closing member is disposed in the ignition device chamber, the closing member has an annular shape and the inner circumferential surface of the annular closing member abuts against the outer circumferential wall surface of the partition wall.

Prior to activation, a high pressure is applied from the pressurized gas chamber to the bottom surface and circumferential wall surface of the partition wall.

However, the load applied to the inner circumferential surface of the closing member is received at least by the surface corresponding to the opening area of the communication hole, and where the partition wall is sufficiently thick to withstand the filled gas pressure of the pressurized gas, the load applied to the inner circumferential surface of the closing member at the time of activation does not so much inhibit the axial movement of the closing member.

Further, the pressure of the pressurized gas acts upon the circumferential wall surface of the partition wall so as to increase the closing strength of the communication hole and the fixing strength of the disk closing member prior to activation.

This gas generator operates in the same manner as the gas generator of invention 1.

A preferable aspect 2-2 of Invention 2 is the gas generator wherein, the annular closing member has an inner annular groove portion at the central portion in the thickness direction of the inner circumferential surface, and a first inner annular circumferential wall portion and a second inner annular circumferential wall portion at both ends respectively in the thickness direction of the inner circumferential surface, and prior to activation, the communication hole is closed by a space bounded by the inner annular groove portion, the first inner annular circumferential wall portion, and the second inner annular circumferential wall portion in a state in which the inner annular groove portion of the annular closing member faces the communication hole, and the first inner annular circumferential wall portion and the second inner annular circumferential wall portion abut against the circumferential wall surface of the partition wall.

The annular closing member abuts against and is fixed to the circumferential wall surface of the partition wall in the first inner annular circumferential wall portion and the second inner annular circumferential wall portion, and the contact surface area is reduced by comparison with the case in which the annular closing member abuts and is fixed over the entire inner circumferential surface thereof.

Therefore, the force necessary to move the annular closing member at the time of activation can be reduced.

When the first inner annular circumferential wall portion and the second inner annular circumferential wall portion are fixed by welding to the circumferential wall surface of the partition wall, the surface area of the welded portion can be also reduced and the welding surface area can be made constant. Therefore, the force necessary to move the annular closing member at the time of activation can be made small and constant while maintaining the fixing strength.

DESCRIPTION OF EMBODIMENTS

Figure 1:
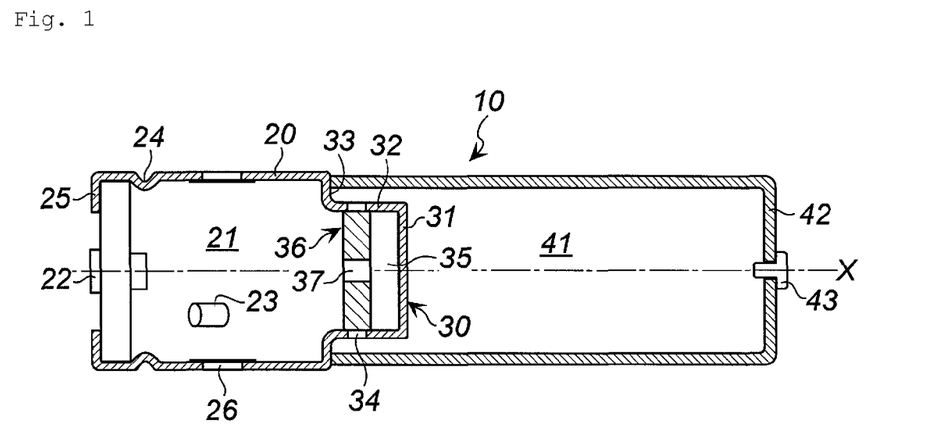
FIG. 1 is a cross-sectional view in the axial direction of a gas generator according to the present invention.
Figure 2:
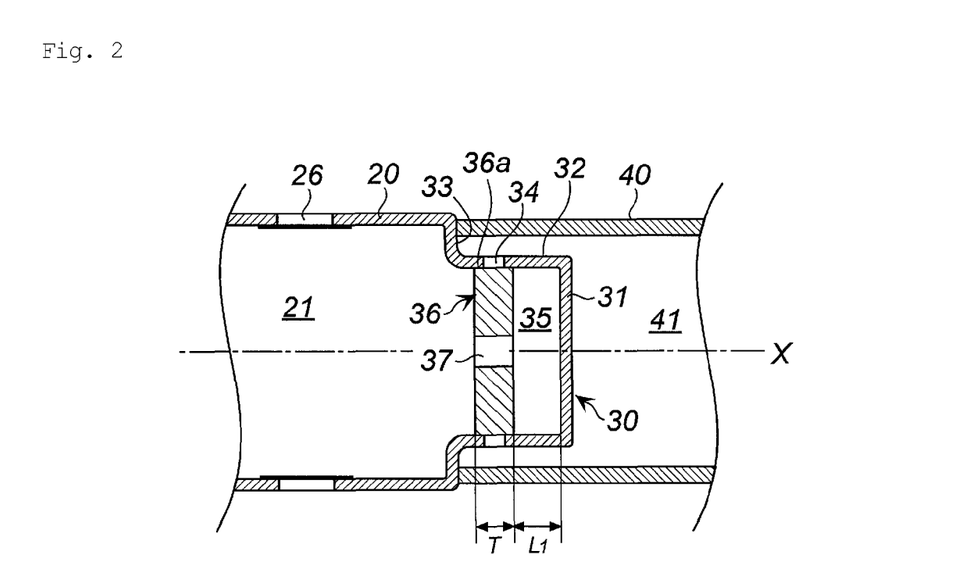
FIG. 2 is a partial enlarged view of the configuration shown in FIG. 1.

(1) Gas Generator Illustrated in FIGS. 1 and 2

An outer shell container of a gas generator 10, aligned in the X-axis direction, is formed by joining an ignition device chamber housing 20 and a pressurized gas chamber housing 40. Both housings are made from stainless steel and have a circular sectional shape in the width direction (the direction perpendicular to the X-axis).

The interior of the ignition device chamber housing 20 serves as an ignition device chamber 21, accommodating a known electric igniter 22 and a gas-generating agent 23.

The electric igniter 22 is fixed from both sides in the X-axis direction by an inward protrusion 24 and a crimped portion 25 at one end of the ignition device chamber housing 20.

A gas discharge port 26 is formed in the circumferential wall portion of the ignition device chamber housing 20 and closed from inside with a seal member such as a sealing tape.

The interior of the pressurized gas chamber housing 40 is defined as a pressurized gas chamber 41 filled with a gas, such as argon and helium, under a high pressure.

The pressurized gas chamber housing 40 is filled with the pressurized gas through a filling hole provided in a bottom surface 42. The filling hole is closed by welding together with a pin 43.

A partition wall 30 closes between the ignition device chamber housing 20 and the pressurized gas chamber housing 40.

The partition wall 30 is in a cup-like shape including a bottom surface 31 and a circumferential wall surface 32 and projecting from the ignition device chamber 21 toward the pressurized gas chamber 41. A flange portion 33 is provided at a portion corresponding to an opening in the cup-like shape of the partition wall.

A plurality of communication holes 34 are provided in the circumferential wall surface 32, but no communication hole is formed in the bottom surface 31. The diameter of the circumferential wall surface 32 is less than that of the circumferential wall portion (the inner diameter) of the pressurized gas chamber housing 40. The communication holes 34 face the inner circumferential wall surface of the pressurized gas chamber housing 40.

The partition wall 30 is of the same material as the ignition device chamber housing 20 and formed integrally with the ignition device chamber housing 20 in the flange portion 33.

A disk closing member 36 is disposed inside the cup-like partition wall 30 to be axially movable with a distance (space) 35 from the bottom surface 31.

The disk closing member 36 has a through-hole 37. One, or two or more through-holes 37 can be provided in a portion excluding a circumferential surface 36a. For example, the through-hole can be provided at the same location as the through-hole 137 in FIG. 3.

The through-hole 37 passes through from one end surface to the other end surface of the disk closing member 36 so as to make communication between the space 35 and the ignition device chamber 21. The size of the through-hole is such that the gas-generating agent does not pass therethrough. The present invention can be also embodied without providing the through-hole 37.

Prior to activation, the circumferential surface 36a of the disk closing member 36 abuts against the circumferential wall surface 32 having the communication holes 34, thereby closing the communication holes 34.

The circumferential surface 36a is welded at a portion abutting against the circumferential wall surface 32 having the communication holes 34.

Where the disk closing member 36 is not welded, it may be formed by stainless steel same as that of the partition wall 30, or by a metal lower in hardness than the stainless steel, such as aluminum.

Due to a gas pressure inside the pressurized gas chamber 41, a pressure is applied inward to the circumferential wall surface 32 from outside. As a result, the disk closing member 36 is pressed inward from the circumferential surface 36a.

The operation of the gas generator shown in FIGS. 1 and 2 is explained hereinbelow with respect to the case in which the gas generator is used for an airbag apparatus.

When the igniter 22 is activated, the gas generating agent 23 in the ignition device chamber 21 is ignited and burned, thereby generating a gas.

As a result, the pressure inside the ignition device chamber 21 rises, and therefore, the sealing tape is ruptured to open the gas discharge port 26, and the gas is discharged to inflate the airbag.

Where the pressure inside the ignition device chamber 21 rises, the disk closing member 36 is pushed and moves in the X-axis direction (toward the bottom surface 31) while contracting the space 35. At this time, the air (the air introduced when the gas generator is manufactured) inside the space 35 escapes from the through-hole 37 into the ignition device chamber 21. Therefore, the movement of the closing member 36 is not impeded.

In this case, since the thickness T of the disk closing member 36 and the length L1 of the space 35 satisfy the relationship of L1>T, the communication hole 34 is opened when the disk closing member 36 reaches the bottom surface 31.

Therefore, the gas in the pressurized gas chamber 41 enters the ignition device chamber 21 through the communication hole 34, and then, is discharged from the gas discharge port 26 to inflate the airbag.

While the gas is discharged, the interior of ignition device chamber 21 is kept under a high pressure, and the communication hole 34 is not formed in the bottom surface 31, and thereby the disk closing member 36 that has reached the bottom surface 31 does not move towards the ignition device chamber 21 to reclose the communication hole 34.

In the embodiment in which the through-hole 37 is not provided in the disk closing member 36, it is preferred that the length L1 be made sufficiently larger than the thickness T (for example, L1 is two or more times larger than T). Furthermore, by adjusting a pressure generated inside the ignition device chamber 21 to a sufficiently high level, the communication hole 34 can be made entirely open before the disk closing member 36 reaches the bottom surface 31 while moving to contract the space 35.

Figure 3:
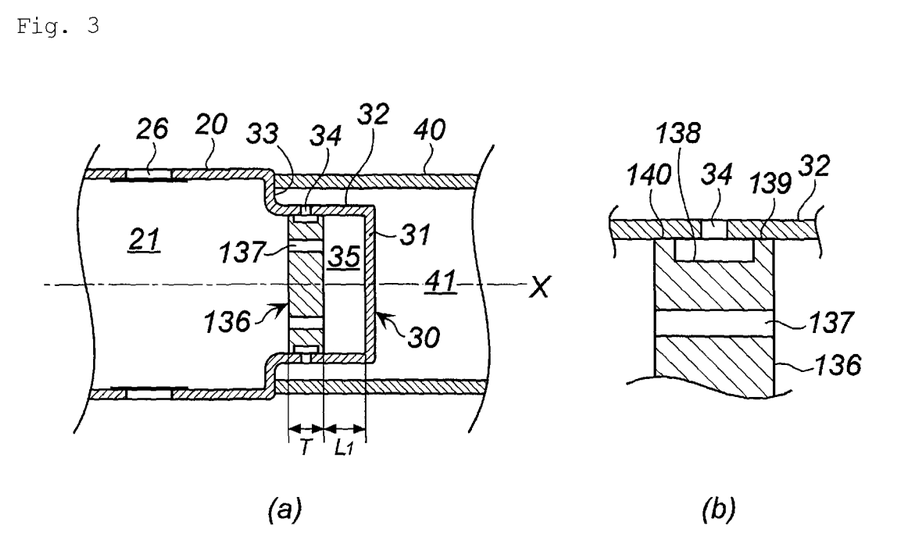

(2) Gas Generator Illustrated in FIG. 3

The gas generator shown in (a) in FIG. 3 is the same as the gas generator 10 in FIGS. 1 and 2, except that a disk closing member 136 is used instead of the disk closing member 36.

The formation position of a through-hole 137 is different from that in the disk closing member 36 in FIGS. 1 and 2, but the position of the through-hole 137 may be the same as the position of the through-hole 37 in the disk closing member 36 in FIGS. 1 and 2.

The disk closing member 136 has an annular groove portion 138 at the central portion in the thickness direction (the X-axis direction) of the circumferential surface, and a first annular circumferential wall portion 139 and a second annular circumferential wall portion 140 at both ends respectively in the thickness direction of the annular groove portion 138.

Prior to activation, the annular groove portion 138 of the disk closing member 136 faces the communication hole 34, and the first annular circumferential wall portion 139 and the second annular circumferential wall portion 140 abut against and are fixed to the circumferential wall surface of the partition wall. The diameter of the communication hole 34 is less than the width of the annular groove portion 138 in the X-axis direction.

Therefore, the communication hole 34 is closed by a space bounded by the annular groove portion 138, the first annular circumferential wall portion 139, and the second annular circumferential wall portion 140.

The first annular circumferential wall portion 139 and the second annular circumferential wall portion 140 are welded to the circumferential wall surface 32 of the partition wall. In the case of welding, since the welding surface area is small, the movement at the time of activation is not impeded. Further, since the welding width (welding width corresponding to the width of the first annular circumferential wall portion 139 and the second annular circumferential wall portion 140 in the X-axis direction) is constant, the load necessary to move the closing member is stable (constant).

The gas generator shown in (a) in FIG. 3 operates in the same manner as the gas generator 10 shown in FIG. 1.

Figure 4:
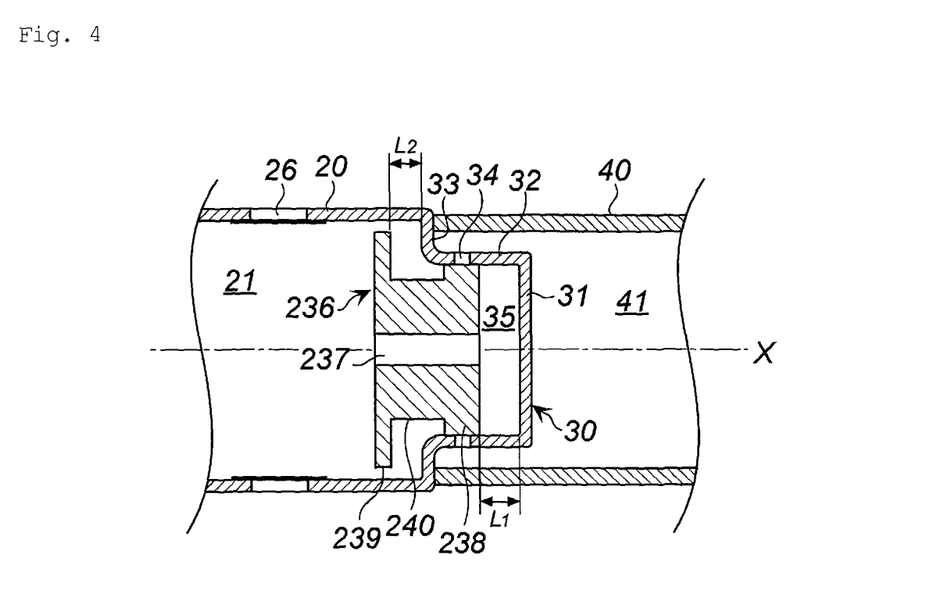
FIG. 4 is a partial enlarged view, corresponding to FIG. 2, of an embodiment other than those shown in FIGS. 1 and 3.

(3) Gas Generator Illustrated in FIG. 4

The gas generator shown in FIG. 4 is the same as the gas generator 10 in FIGS. 1 and 2, except that a disk closing member 236 having a through-hole 237 is used instead of the disk closing member 36.

The disk closing member 236 has a first circular base plate portion 238 and a second circular base plate portion 239 and also has an annular groove 240 therebetween. The dimensional relationship of the outer diameters of these base plate portions and the groove is expressed as (the second circular base plate portion 239)>(the first circular base plate portion 238)>(the annular groove 240).

The first circular base plate portion 238 has a disk shape, but can also have the shape provided with the circumferential surface shown in (b) in FIG. 3.

Prior to activation, the communication hole 34 is closed by the circumferential surface of the first circular base plate portion 238.

The thickness of the first circular base plate portion 238 (the thickness corresponding to T in FIG. 2) is less than the length L1 of the space 35.

The cross-sectional area of the second circular base plate portion 239 in the radial direction thereof is greater than the cross-sectional area of the first circular base plate portion 238 in the radial direction thereof, and, therefore, receives a larger pressure at the time of activation.

The outer circumferential surface of the second circular base plate portion 239 is separated from the inner wall surface of the ignition device chamber housing 20.

At the time of activation, the second circular base plate portion 239 which has received the pressure is pushed in the X-axis direction. As a result, the first circular base plate portion 238 of the closing member 236 moves toward the bottom surface 31 and the communication hole 34 is opened.

Since the distance L2 between the second circular base plate portion 239 and the flange portion 33 is larger than the length L1 of the space 35, the second circular base plate portion 239 does not abut against the flange portion 33 by the movement of the closing member 236, and a gas discharge path is ensured.

The gas generator shown in FIG. 4 operates in the same manner as the gas generator 10 shown in FIG. 1.

Figure 5:
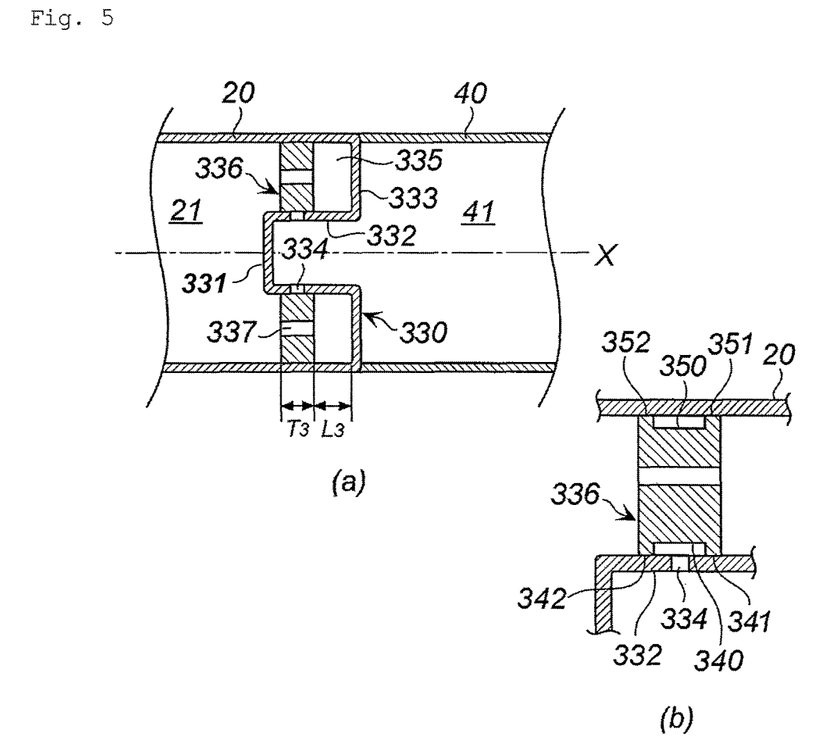

(4) Gas Generator Illustrated in FIG. 5

The gas generator shown in (a) in FIG. 5 is the same as the gas generator 10 in FIGS. 1 and 2, except that a partition wall 330 is used instead of the partition wall 30 of the gas generator 10 in FIGS. 1 and 2 and an annular closing member 336 having a through-hole 337 is used instead of the disk closing member 36 of the gas generator 10 in FIGS. 1 and 2.

The partition wall 330 is in a cup-like shape including a bottom surface 331 and a circumferential wall surface 332 and projecting from the pressurized gas chamber 41 toward the ignition device chamber 21. A flange portion 333 is provided at an opening portion thereof.

The circumferential wall surface 332 has communication holes 334.

The flange portion 333 is formed integrally with the ignition device chamber housing 20.

The annular closing member 336 having the through-hole 337 is disposed outside the cup-like partition wall 330 to be axially movable with a distance (annular space) 335 from the flange portion.

Prior to activation, the communication hole 334 is closed by the inner circumferential surface of the annular closing member 336 abutting against the circumferential wall surface 332 of the partition wall.

The outer circumferential surface of the annular closing member 336 may abut against the inner wall surface of the ignition device chamber housing 20.

The annular closing member 336 is welded at a portion abutting against the circumferential wall surface 332 having the communication holes 334.

Due to a gas pressure inside the pressurized gas chamber 41, a pressure is applied outward to the circumferential wall surface 332 from inside. As a result, the annular closing member 336 is pressed in the direction toward the outer circumferential surface from the inner circumferential surface.

Instead of the annular closing member shown in (a) in FIG. 5, an annular closing member 336 shown in (b) in FIG. 5 can be used. Such an annular closing member 336 has an inner annular groove portion 340 at the central portion in the thickness direction of the inner circumferential surface, an outer annular groove portion 350 at the central portion in the thickness direction of the outer circumferential surface, a first inner annular circumferential wall portion 341 and a second inner annular circumferential wall portion 342 at both ends respectively in the thickness direction of the inner annular groove portion 340, and has a first outer annular circumferential wall portion 351 and a second outer annular circumferential wall portion 352 at both ends respectively in the thickness direction of the outer annular groove portion 350.

Prior to activation, the communication holes 334 are closed by the space bounded by the inner annular groove portion 340, the first inner annular circumferential wall portion 341 and the second inner annular circumferential wall portion 342 in a state in which the inner annular groove portion 340 of the annular closing member 336 faces the communication holes 334 and the first inner annular circumferential wall portion 341 and the second inner annular circumferential wall portion 342 abut against the circumferential wall surface 332 of the partition wall.

The first inner annular circumferential wall portion 341 and the second inner annular circumferential wall portion 342 are welded to the circumferential wall surface 332 of the partition wall.

The first outer annular circumferential wall portion 351 and the second outer annular circumferential wall portion 352 may be press-fitted into or welded to the ignition device chamber housing 20.

At the time of activation, the annular closing member 336 which has received the pressure is pushed in the X-axis direction. As a result, the closing member 336 moves toward the flange portion 333 and the communication hole 334 is opened.

The thickness T3 of the annular closing member 336 is less than the length L3 of the space 335. Therefore, when the annular closing member 336 has moved to the flange portion 333, the communication hole 334 is opened.

The gas generator shown in (a) in FIG. 5 operates in the same manner as the gas generator 10 shown in FIG. 1.

In the case that a gap is present between the outer circumferential surface of the annular closing member 336 and the ignition device chamber housing 20 in FIG. 5, the through-holes 337 may not be provided.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising:
   a housing having therein an ignition device chamber, which is provided with a gas discharge port and accommodates an ignition device, and a pressurized gas chamber filled with a pressurized gas;
   a partition wall having a communication hole therein for separating the ignition device chamber and the pressurized gas chamber,
   the partition wall being in a cup-like shape which includes a bottom surface and a circumferential wall surface, and which projects from the ignition device chamber toward the pressurized gas chamber, the partition wall having a flange portion provided at a portion corresponding to an opening of the partition wall in the cup-like shape and being fixed to the housing,
   the communication hole being provided only in the circumferential wall surface;
   a disk closing member being disposed inside the partition wall to be movable in an axial direction of the housing with a distance from the bottom surface,
   prior to activation, the communication hole being closed by a circumferential surface of the disk closing member, and
   at the time of activation, the disk closing member being moved toward the bottom surface by combustion products generated by activation of the ignition device, thereby opening the communication hole and making communication between the ignition device chamber and the pressurized gas chamber.

2. The gas generator according to claim 1 wherein,
   the disk closing member has an annular groove portion at a central portion in a thickness direction of the circumferential surface thereof, and a first annular circumferential wall portion and a second annular circumferential wall portion at both ends respectively in the thickness direction of the circumferential surface, and
   prior to activation, the communication hole is closed by a space bounded by the annular groove portion, the first annular circumferential wall portion, and the second annular circumferential wall portion in a state in which the annular groove portion of the disk closing member faces the communication hole, and the first annular circumferential wall portion and the second annular circumferential wall portion abut against the circumferential wall surface of the partition wall.

3. The gas generator according to claim 1 wherein,
   the disk closing member has a first circular base plate portion and a second circular base plate portion, has an annular groove in the circumferential surface therebetween, and has a through-hole in the thickness direction,
   a cross-sectional area of the second circular base plate portion in a radial direction thereof is greater than a cross-sectional area of the first circular base plate portion in a radial direction thereof, and the first circular base plate portion is arranged to face the bottom surface of the partition wall, prior to activation, the communication hole is closed by a circumferential surface of the first circular base plate portion, and at the time of activation, the first circular base plate portion of the disk closing member is moved toward the bottom surface by combustion products generated by activation of the ignition device, thereby opening the communication hole and making communication between the ignition device chamber and the pressurized gas chamber.

4. The gas generator according to claim 3 wherein, the first circular base plate portion of the disk closing member has an annular groove portion at the central portion in the thickness direction of the circumferential surface, and a first annular circumferential wall portion and a second annular circumferential wall portion at both ends respectively in the thickness direction of the circumferential surface, and prior to activation, the communication hole is closed by a space bounded by the annular groove portion, the first annular circumferential wall portion, and the second annular circumferential wall portion in a state in which the annular groove portion of the first circular base plate portion faces the communication hole, and the first annular circumferential wall portion and the second annular circumferential wall portion abut against the circumferential wall surface of the partition wall.

5. A gas generator, comprising:

a housing having therein an ignition device chamber, which is provided with a gas discharge port and accommodates an ignition device, and a pressurized gas chamber filled with a pressurized gas; a partition wall having a communication hole therein for separating the ignition device chamber and the pressurized gas chamber, the partition wall being in a cup-like shape which includes a bottom surface and a circumferential wall surface, and which projects from the pressurized gas chamber toward the ignition device chamber, the partition wall having a flange portion provided at a portion corresponding to an opening of the partition wall in the cup-like shape and being fixed to the housing, the communication hole being provided only in the circumferential wall surface, an annular closing member being disposed outside the partition wall to be movable in the axial direction of the housing with a distance from the flange portion, prior to activation, the communication hole being closed by an inner circumferential surface of the annular closing member abutting against an outer circumferential wall surface of the partition wall, and at the time of activation, the annular closing member being moved toward the flange portion by combustion products generated by activation of the ignition device, thereby opening the communication hole and making communication between the ignition device chamber and the pressurized gas chamber.

6. The gas generator according to claim 5 wherein, the annular closing member has an inner annular groove portion at a central portion in a thickness direction of the inner circumferential surface, and a first inner annular circumferential wall portion and a second inner annular circumferential wall portion at both ends respectively in the thickness direction of the inner circumferential surface, and prior to activation, the communication hole is closed by a space bounded by the inner annular groove portion, the first inner annular circumferential wall portion, and the second inner annular circumferential wall portion in a state in which the inner annular groove portion of the annular closing member faces the communication hole, and the first inner annular circumferential wall portion and the second inner annular circumferential wall portion abut against the circumferential wall surface of the partition wall.

\* \* \* \* \*